J. C. WAHL.
CALCULATING MACHINE.
APPLICATION FILED SEPT. 7, 1911.

1,148,732.

Patented Aug. 3, 1915.
7 SHEETS—SHEET 1.

Fig. 1.

Witnesses:
Jno. H. Nelson Jr.
Edwin B. Nelson

Inventor:
John C. Wahl.
By Hyman Eli Goldberg
Atty.

J. C. WAHL.
CALCULATING MACHINE.
APPLICATION FILED SEPT. 7, 1911.

1,148,732.

Patented Aug. 3, 1915.
7 SHEETS—SHEET 2.

Fig. 6.

Witnesses:
Jno. H. Nelson Jr.
Edwin B. Nelson

Inventor:
John C. Wahl.
By. Hyman Eli Goldberg
Atty

J. C. WAHL,
CALCULATING MACHINE.
APPLICATION FILED SEPT. 7, 1911.

1,148,732.

Patented Aug. 3, 1915.
7 SHEETS—SHEET 4.

Witnesses:
Jno. H. Nelson Jr.
Edwin B. Nelson

Inventor:
John C. Wahl.
By Hyman Eli Goldberg
Atty.

UNITED STATES PATENT OFFICE.

JOHN C. WAHL, OF CHICAGO, ILLINOIS, ASSIGNOR, BY MESNE ASSIGNMENTS, TO WAHL ADDING MACHINE COMPANY, OF WILMINGTON, DELAWARE, A CORPORATION OF DELAWARE.

CALCULATING-MACHINE.

1,148,732.  Specification of Letters Patent.  Patented Aug. 3, 1915.

Application filed September 7, 1911. Serial No. 648,011.

*To all whom it may concern:*

Be it known that I, JOHN C. WAHL, a citizen of the United States, residing at Chicago, in the county of Cook and State of Illinois, have invented certain new and useful Improvements in Calculating - Machines, of which the following is a specification.

My invention relates to calculating machines, and particularly to adding and subtracting attachments to typewriters.

In Patent No. 893,719 issued to me on July 21, 1908, there is shown an adding and subtracting calculating machine mounted upon a Remington typewriter. The calculating machine is shown as connected with the keys of the typewriter, the operation of which results in the operation of the calculating machine also. The machine contains a master wheel and a master dog coöperating therewith, which master wheel and master dog constitute a master couple which engages and operates the totalizer. As there shown, the machine is provided with a disconnecting handle which may be put in a disconnecting position, and then the numeral keys of the typewriter may be operated without simultaneously operating the calculating machine. The machine has also a reversing handle whereby certain of its parts may be shifted to change the direction of the rotation of the master wheel. As there shown the machine has but one master couple.

In my present invention, the calculating machine is provided with two master couples, namely, two master wheels, each of which is provided with its own coöperating master dog. Moreover, I am able to so "set" the mechanism that the operating of the keys will result in the operating of both, of either, or of neither of the master couples. Again, the direction of the rotation of each master wheel is at the disposal of the operator. This provision of the machine with a plurality of master couples and the means of operating them is the main object of my invention.

The invention is illustrated by the drawings which accompany this specification of which—

Fig. 2 is a side elevation of same.

Attention is here again directed to my previously cited Patent No. 893,719 which shows the mechanism in almost the same construction as in the present drawings, and to which reference is made for more thorough description of the parts and operations thereof.

The framework of the typewriter and of the calculating machine also is denoted by 1. Traveling upon the framework 1, and operable by the keys of the typewriter is the carriage 2. Fastened to the carriage 2 is the totalizer 3. The totalizer and carriage therefore move along during the letter space advance of the typewriter. Mounted in the framework 1 are the keys, inclusive of the numeral keys 4. Each numeral key is connected to one end of a link 5 whose other end is connected to the cam piece 6. All of the cam pieces 6 are rotatably mounted upon the cam piece shaft 7 which is supported in the framework. Mounted upon the same shaft 7 are a set of goose-necks 8, one for each cam piece 6. A stud 9 rigidly fastened in each goose-neck protrudes through a slot 10 of the coöperating cam piece 6. The depressing of the numeral key 4 therefore results in the rotating of its connected cam piece 6, and its coöperating goose-neck 8, about the shaft 7. When the key is released it rises under the influence of its spring (not shown), and the cam piece and coöperating goose-neck will also return to their normal position.

Figure 1:
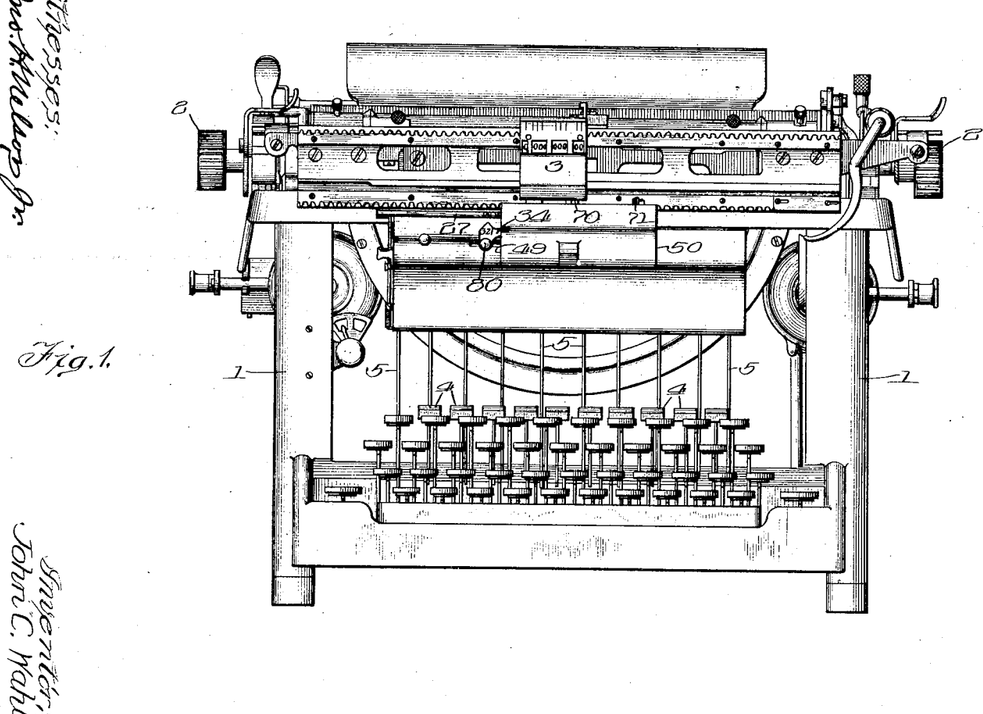
Figure 1 is a front elevation of the typewriter with the calculating machine mounted thereon.
Figure 3:
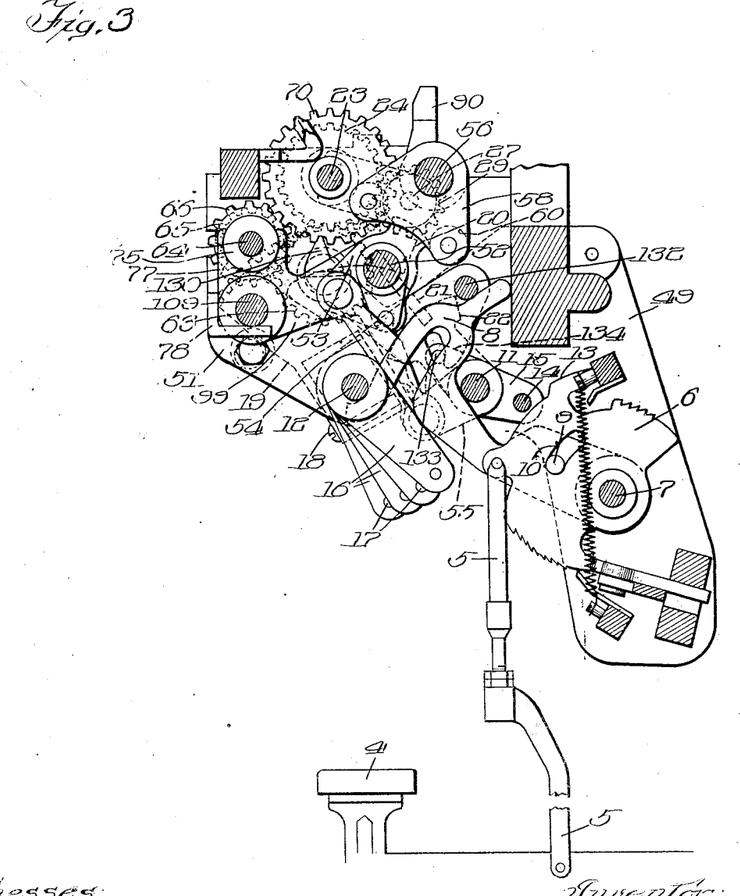
Fig. 3 is a section of the master mechanism of the calculating machine.
Figure 4:
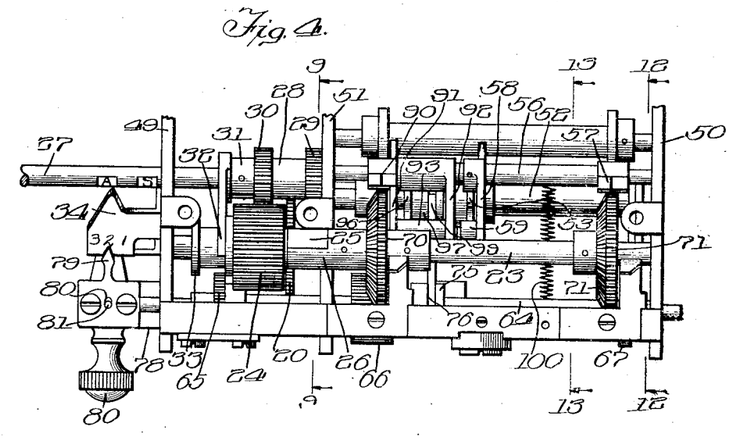
Fig. 4 is a plan and Fig. 5 an elevation of the master wheels and mechanism immediately associated therewith.
Figure 5:
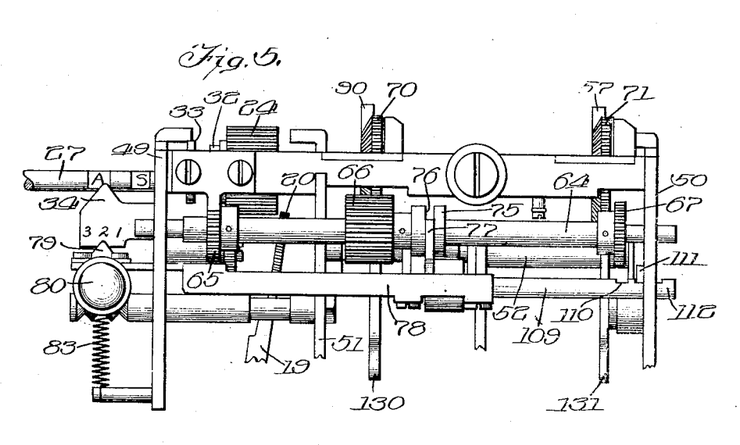

Mounted in the framework are two shafts, the rock shaft 11, and the sector shaft 12. The rock shaft is operated by the cam pieces and the sector shaft by the goose-necks. The mechanism for operating the rock shaft consists of a cam 13, upon each cam piece, and a roller shaft 14 extending in front of all of the cam pieces and supported by two end pieces 15 which are rigidly fastened to the rock shaft. The parts are shown in normal position in Fig. 3. When the numeral key is depressed and its connecting cam piece consequently vibrates about its center, then the cam 13 strikes against the roller shaft 14 and carries it along rotating the rock shaft 11 about its center. Very soon the cam 13 which has a circular dwell formed thereon rolls under the roller shaft 14 and the rock shaft 11 therefore comes to rest. The cam piece 6 continues to advance, and very soon its cam 13 passes from underneath the roller shaft 14. By a spring (not shown) the shaft 14 has a tendency to place itself so that the three axes of shafts 11, 14, and 7, are coplanar. When the cam 13 passes from under the roller shaft 14 the spring just mentioned pulls the roller shaft 14 back to its central position just described. The rock shaft therefore receives a partial return movement. The cam piece continues to advance farther, but does not produce any more work, the rest of its motion being nothing by clearance. Upon its return the cam piece again strikes the roller shaft 14 by means of its cam 13, but now being on the other side thereof, and in the opposite direction, it pushes the roller shaft 14 away in the opposite direction from its central position, causing the rock shaft to rock in the opposite direction from before. The cam 13 now again passes from under the roller shaft 14 which is again brought back by the spring to its central position. The result of the operation of the cam piece upon the rock shaft therefore is that 1, the rock shaft advances from its central position; 2, it dwells in the advanced position; 3, it returns to its central position; 4, its dwells in its central position; 5, it moves to its receded position; 6, it dwells in its receded position; 7, it returns to its central position again, and 8, it remains in its central position. This completes the cycle of operations for the depressing of any key.

Mounted upon the sector shaft 12 are a series of arms 16 spirally arranged, and each one provided with a pin 17 to coöperate with a curved slot-like portion in the goose-necks 8. The depressing of any key and the consequent vibration of its connected gooseneck upon its supporting shaft 7 results in the striking of the goose-neck against its coöperating pin 17 and the consequent rotation of the sector shaft about its center. This rotation of the sector shaft continues as long as the goose-neck is pushing against the pin, but toward the end of its motion the pin 17 moves into the curved slot-like portion which is formed in the shape of a circular arc with shaft 7 as a center. The pushing therefore ceases and the pin and consequently its supporting arm and the sector shaft 12 therefore come to rest. The shaft 12 therefore receives a movement and the amount of said movement depends upon the particular pin 17 which was struck by the goose-neck. This movement is different for each one of the keys, and might therefore be called differential movement. The key 0 gives the sector shaft 0 steps of movement. The key 1, gives 1 step of movement, etc., and key 9 gives it 9 steps of movement. Upon the releasing of the key the gooseneck returns to its normal position and the sector shaft and pieces mounted thereon also return to their normal position.

Figure 9:
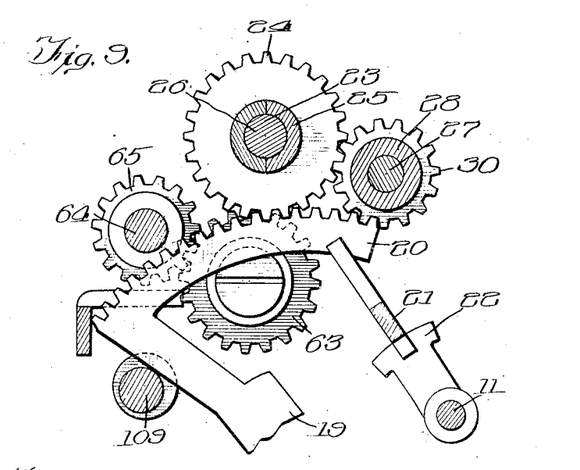
Fig. 9 is a view of part of the reversing gearing connected with the master wheels, taken along the plane 9—9 of Fig. 4.
Figure 10:
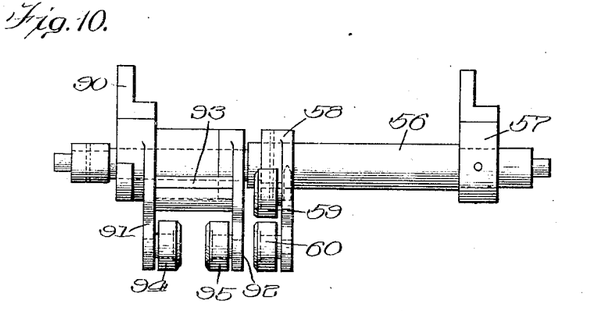
Fig. 10 is a front view of the master dog shaft and the parts thereon.
Figure 11:
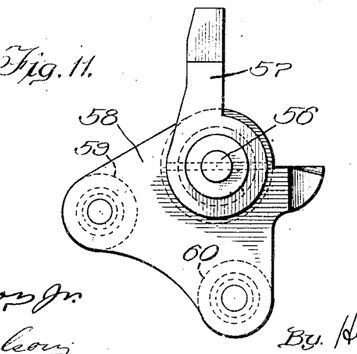
Fig. 11 is a side view of same.

Rigidly fastened upon and perpendicular to the sector shaft 12 is the sector pin 18. Pivotally mounted thereon is the sector 19 which has its upper end formed into a gear 20 (Figs. 3, 4, 5, and 9). Sliding in the framework is a sector shifting plate 21 (Figs. 3 and 9) which has two slots, in the upper one of which is inserted the sector gear 20 above mentioned, and in the lower one of which is inserted a helical cam 22 rigidly fastened to the rock shaft (Fig. 9). The vibrating of the rock shaft about its center as above described therefore results in the moving of the helical cam 22 and the consequent shifting of plate 21 in its bearings. The plate in turn affects the sector gear and vibrates it about its supporting pin 18.

Rotatably mounted in the framework is a master gear shaft 23 (Figs. 3, 4, 6, 7, 8, 9, 12, and 13). Slidably mounted thereon is a direct gear 24, which has extending therefrom a half-hub 25 which mates with another half-hub 26 rigidly fastened to the master gear shaft 23. The direct gear and master gear shaft therefor always rotate together but the direct gear is capable of an adjustment on the shaft in an axial direction. Mounted in the framework somewhat behind the master gear shaft is the reversing shaft 27 which is capable of a sliding movement in the bearings and upon which is rotatably mounted the reversing gear 28. This gear is composed of a gear portion 29 to the right and a gear portion 30 to the left. The direct gear and the reversing gear are always in mesh with each other and therefore always rotate in opposite directions. Rigidly fastened to the reversing shaft is a fork 31 which embraces between its tines 32 a collar 33, forming a part of the direct gear 24. The reversing shaft is capable of being slid into either of two positions. Figs. 4, 5, 6, 7, and 8 show it in one position, namely, the one to the right with a letter A marked upon the reversing shaft opposite the indicator 34. This is short for Add. In this position it will be noticed by an examination of Fig. 5 that if the sector 19 be swung about its sector pin 18 to become perpendicular to the sector shaft 12, it would be in mesh with the direct gear 24 but would not be in mesh with the reversing gear 28, as it would be located between the two gears 29 and 30. Upon the rotation of the sector the direct gear would therefore be given a consequent rotation, and the master gear shaft 23 a similar rotation, namely, one opposite in direction to the rotation of the sector. But it is quite evident that if the reversing shaft 27 be shifted to the left, carrying along with it to the left both the reversing gear 28 and the direct gear 24, then the direct gear would be carried far enough away to be out of mesh with the sector 19 while the gear 29 of the reversing gear would be brought into position to mesh with this sector. Any rotation of the sector would now first drive the reversing gear and then the direct gear and finally the master gear shaft. The shaft and the sector would under these circumstances rotate in the same direction. This is the reason for the names, "direct gear" and "reversing gear". Of course there is a spring latch to hold the reversing shaft in either of two located positions to prevent any accidental movement thereof.

Mounted upon a short shaft between the plates 50 and 51 forming a part of the framework (Figs. 4 to 8) is a master dog operating shaft 52. Rigidly fastened thereto is an arm 53 which is connected by a link 54 to an arm 55 rigidly fastened to the rock shaft 11. The vibration of the rock shaft as above explained therefore results in the vibration of shaft 52 about its center. Somewhat to the back and above the shaft 52 is the master dog shaft 56 (Figs. 3, 4, 10, 11, 12, and 13). Rigidly fastened to the shaft 56 at one end thereof is the fixed master dog 57 and a driving arm 58 which has mounted thereon two rollers 59 and 60. These two rollers coöperate with a cam 61 rigidly fastened to the shaft 52 above mentioned. The vibrating of the shaft 52 as previously explained therefore results in the vibrating of the master dog shaft 56 about its center and the consequent swinging of the master dog 57 forward (to the left) (Figs. 3, 11, 12, and 13). It also results in the return vibration of the cam 61 and the consequent replacement of the master dog shaft and the fixed master dog into their normal position.

The parts thus far mentioned and the operations described have been thoroughly shown and explained in my above cited Patent No. 893,719. The only reason why such a long and extended explanation has been gone into is because the parts are not quite the same shape as those shown in said patent and it was desired to place this description upon a somewhat independent foundation. For any more thorough description of the operations reference is therefore had to Patents No. 893,718, and No. 893,719, issued to me July 21, 1908.

The complete mechanism showing my new invention will now be taken up.

Figure 6:
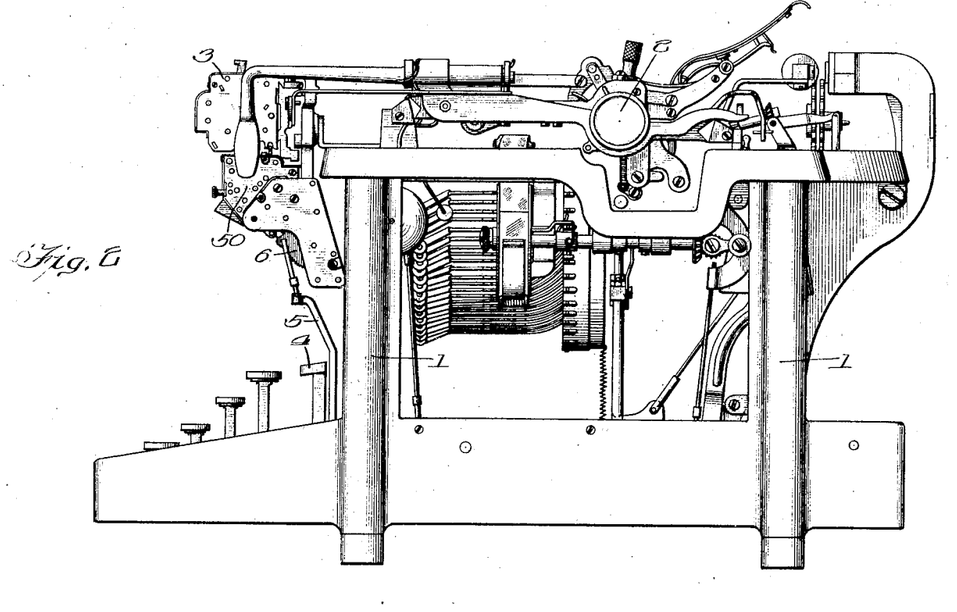
Figs. 6, 7, and 8 are plan views of some of the parts connected with the master wheels showing these parts in different positions for the different settings of the machine.

Mounted in the plate 49 forming a part of the framework is a stud 62 (Figs. 6, 7, and 8) which serves as a bearing for a gear 63 always in mesh with the direct gear 24. Slidably and rotatably mounted in the plates 49 and 51 is a shaft 64 (Figs. 3, 9, 12, and 13) which has rigidly fastened thereon three gears, namely, the gear 65 at the left, the gear 66 at the middle and the gear 67 at the right. Rotatably but not slidably mounted upon the master gear shaft 23 is the loose master gear 70. Rigidly fastened to the same shaft at the end thereof is the fixed master gear 71. The master gear 71 therefore always rotates whenever any of the gearing is rotated. But the master gear 70 does not always rotate, and when it does rotate, it sometimes rotates in one direction and sometimes in the other. The connections are perfectly evident upon an examination of Figs. 6, 7, and 8. In Fig. 6 it is seen that the direct gear 24 drives the intermediate gear 63 which in turn drives the gear 65 thus rotating the shaft 64 and the gear 66. This gear in turn drives the loose master gear 70. Attention is called to the fact that with the parts in this position there is no interference between the gear 67 and the fixed master gear 71. The two master gears therefore rotate in opposite directions. With the parts located as in Fig. 7, both gears 65 and 67 are out of mesh and therefore there is no driving exerted upon the shifting shaft 64. The loose master wheel 70 is therefore not urged to rotate. Of course, the fixed master wheel 71 rotates. With the parts located as in Fig. 8, it is seen that the gear 65 is out of mesh with the gear 63, while the gear 67 is in mesh with the fixed master wheel gear 71. The rotation of the fixed master wheel 71 therefore causes the rotation of the gear 67, rotating shaft 64 which in turn rotates the gear 66, and this in turn rotates the loose master gear 70. Both master gears 71 and 70 therefore rotate in the same direction. We thus see that by the proper location of the parts, the machine may be set so that the loose master wheel 70 1, rotates in the opposite direction; 2, does not rotate at all; 3, rotates in the same direction as the fixed master gear 71. Moreover, this is independent of the reversing mechanism previously described, which reversing mechanism changes the direction of rotation of all of the master gearing. Inclusive of the reversing mechanism, there are now present not merely three choices but six choices.

In the patents above cited there is also shown a disconnecting handle which can be located in such a position that upon the depressing of the keys, the calculating machine would not be affected. Although not illustrated in these drawings, the disconnecting handle is present in this machine also and this gives an additional choice, namely that of non-operation of both master wheels.

Figure 7:
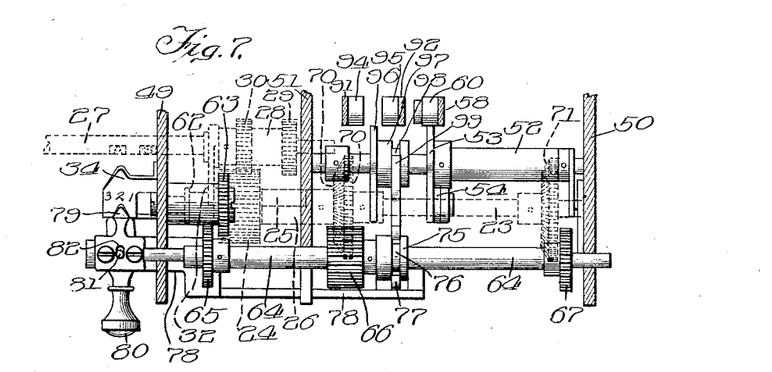
Figure 8:
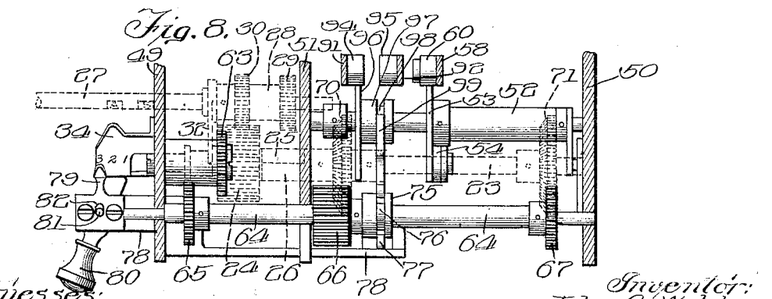

The shifting shaft 64 is shown in three different positions in Figs. 6, 7, and 8. It is brought to such a position and held there by a collar 75 rigidly fastened thereto, which collar has a groove 76 in which extends a tongue 77 of a shifting plate 78 mounted in the framework. At its left side this shifting plate 78 carries a pointer 79 which is thus located to point to either of the Figs. 1, 2, or 3 placed upon the indicator plate 34. The shifting plate 78 is brought to and located in any of the said three positions by means of a handle 80 which has a pin 81 inserted into a slot 82 of said pointer 79. The handle is supported at its back end on the framework and has a spring 83 tending to keep it in any one of its three positions when placed therein. The description of the connections and operations and settings of the master gears is now finished. The operation of the master dogs will therefore be taken up.

It is perfectly evident that the only master dog to be considered is the loose master dog coöperating with the loose master wheel. Of course that need have no motion whatever when the loose master wheel is stationary, that is, when the parts are in the position shown in Fig. 7. But it must have a motion equal to that of the fixed master dog when the loose master wheel does rotate, that is when the parts are in the position shown in Figs. 6 and 8. This is accomplished as follows: The loose master dog 90 (Fig. 10) is rotatably but not slidably mounted upon the master dog shaft 56. Rigidly fastened thereto are two arms 91 and 92. Mounted upon these arms is a long roller 93 and two short rollers 94 and 95, mounted upon arms 91 and 92 respectively. These rollers are for coöperation with a cam 96, slidably but not rotatably mounted upon the shaft 52 previously mentioned. The cam 96 has its upper portion formed to be of the same shape as the cam 61. Fastened to the cam 96 is a collar 97 which has a groove 98 therein in which there extends a tongue 99 of the shifting plate 78 previously mentioned. It is thus seen that when the shifting plate is in its central position the cam 96 is also in a central position and therefore is located between the rollers 94 and 95. Any vibration of the cam will therefore produce no effect upon the loose master dog. But when the cam is in position 1 or 3, then it is opposite either roller 94 or roller 95 and its motion will therefore vibrate the master dog in a manner similar to the vibration of the fixed master dog. To prevent any accidental displacement of the loose master dog, it is provided with a stud 100 to which is fastened one end of a tension spring 101, the other end of which is fastened to the framework. The above completes the description of the parts connected with the master dogs and therefore completes the description connected with the master mechanism which forms the main object of my invention. But I have also provided two subsidiary mechanisms which are really safety devices and which coöperate with the above mechanism, and they will now be described.

Figure 12:
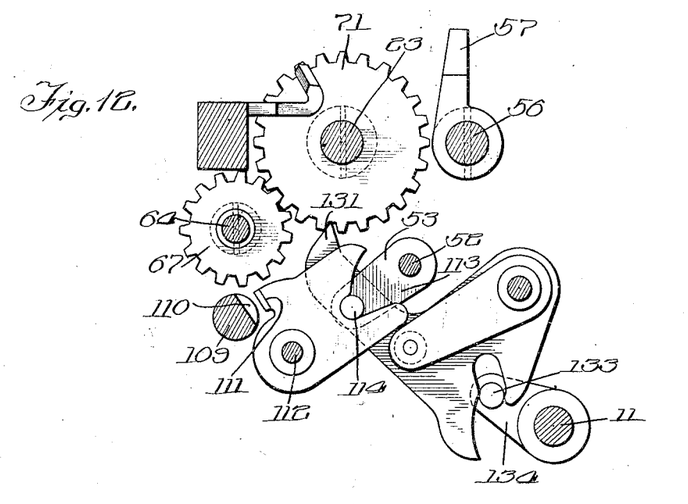
Figs. 12 and 13 are views of the locking pawls for locking the master wheels and mechanism immediately associated therewith taken respectively along the planes 12—12, and 13—13, of Fig. 4.
Figure 13:
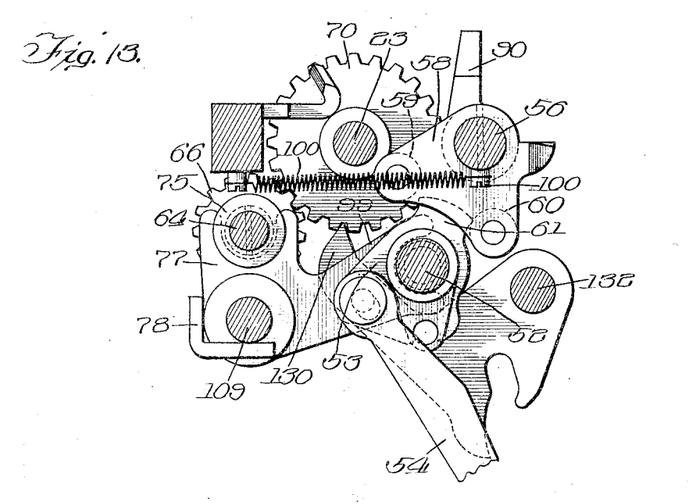

In order to prevent any wrong operation of the parts when the handle 80 is not in its proper position, the shifting plate 78 has rigidly attached thereto a sliding shaft 109 which slides in the bearings in plates 50 and 51. This shaft is provided at its right end (Fig. 5) with three notches 110. Coöperating with these notches is a bolt 111 swinging about a stud 112 riveted in the side wall 50, and it is evident that the bolt 111 will not be capable of entering any of the notches unless the notch be located directly opposite to it. Rigidly fastened to the shaft 52 is an arm 113 which has a stud 114 to coöperate with the bolt 111 (Fig. 12). It is evident therefore that the shaft 52 cannot rotate unless the shifting plate be properly located, and finally that no numeral key of the typewriter can be depressed unless the handle 80 be properly located in one of its three positions.

Coöperating with each of the master wheels 70 and 71 are locking dogs 130 and 131 respectively. These are both rigidly fastened to a shaft 132 and operated by a stud 133 mounted in an arm 134 rigidly fastened to the rock shaft 11. The vibration of the rock shaft therefore results in the unlocking of the master wheel by the retraction of the dogs therefrom and the subsequent relocking of the master wheel as is perfectly evident from an examination of Figs. 3, 12, and 13.

I claim—

1. In a calculating machine: a totalizer; a primary master wheel; an auxiliary master wheel; and mechanism connecting the two whereby the auxiliary master wheel may be caused 1, to rotate in the same direction as the primary master wheel, 2, not rotate at all, and 3, to rotate in the opposite direction as the primary master wheel.

2. In a calculating machine the combination of, a primary master wheel, an auxiliary master wheel, a set of numeral keys operatively connected with both master wheels, and a gear shift device adapted to be placed in any one of three positions and thereby determining that (1) the action of any one of the numeral keys rotates the auxiliary master wheel in the same direction as the primary master wheel, (2) not at all, or (3) in the opposite direction from the primary master wheel.

3. In a calculating machine; a totalizer; a primary master wheel; an auxiliary master wheel; a handle adapted to be located in any of three positions; a mechanism connecting the handle and the master wheels, the locating of the handle in the first position causing the two master wheels to rotate in the same direction, the locating of the handle in the second position causing the primary master wheel to rotate and the auxiliary master wheel to remain stationary, and the locating of the handle in the third position causing the master wheels to rotate in opposite directions.

4. In a calculating machine: a totalizer; a primary master wheel; an auxiliary master wheel; mechanism connecting the two whereby the auxiliary master wheel may be caused to rotate in the same direction, not to rotate at all, or to rotate in the opposite direction as the primary master wheel; and a reversing handle whereby the directions of rotation of both the primary master wheel and the auxiliary master wheel may be simultaneously reversed.

5. In a calculating machine: a totalizer; a primary master wheel; an auxiliary master wheel; a handle adapted to be located in any of three positions; a mechanism connecting the handle and the master wheels, the locating of the handle in the first position causing the two master wheels to rotate in the same direction, the locating of the handle in the second position causing the primary master wheel to rotate and the auxiliary master wheel to remain stationary, and the locating of the handle in the third position causing the master wheels to rotate in opposite directions; and a reversing handle whereby the direction of rotation of both the primary master wheel and the auxiliary master wheel may be simultaneously reversed.

6. In a calculating machine: a totalizer; a master wheel shaft; a master wheel rigidly fastened thereon; a shifting shaft capable of being shifted to any of three positions; gearing on said shifting shaft; an auxiliary master wheel; the gearing on the shifting shaft being adapted to coöperate with both the primary and the auxiliary master wheels whereby the primary master wheel and the auxiliary master wheel rotate in the same direction when the shifting shaft is in one of its positions, and rotate in opposite directions when the shifting shaft is in a second of its positions, and whereby the primary master wheel rotates and the auxiliary master wheel does not rotate when the shifting shaft is in its third position.

7. In a calculating machine: a totalizer; a master wheel shaft; a master wheel rigidly fastened thereon; a shifting shaft capable of being shifted to any of three positions; gearing on said shifting shaft; an auxiliary master wheel; the gearing on the shifting shaft being adapted to coöperate with both the primary and the auxiliary master wheels whereby the primary master wheel and the auxiliary master wheel rotate in the same direction when the shifting shaft is in one of its positions, and rotate in opposite directions when the shifting shaft is in a second of its positions, and whereby the primary master wheel rotates and the auxiliary master wheel does not rotate when the shifting shaft is in its third position; and a handle connected to the shifting shaft.

8. In a calculating machine: a totalizer; a primary master dog and an auxiliary master dog for operating the totalizer; mechanism for driving both; and disconnecting mechanism for disconnecting the auxiliary master dog from the driving mechanism whereby the primary master dog may be operated without simultaneously operating the auxiliary master dog.

9. In a calculating machine: a totalizer; a primary master dog and an auxiliary master dog for operating the totalizer; and mechanism for driving both, said mechanism including a piece adapted to operate the auxiliary master dog and locatable into any of three positions, the auxiliary master dog and said piece coöperating while the piece is in either of two of its positions, but not coöperating while the piece is in its third position.

10. In a calculating machine: a totalizer; a primary master dog and an auxiliary master dog for operating the totalizer; mechanism for driving both, said mechanism including a piece adapted to operate the auxiliary master dog and locatable into any of three positions, the auxiliary master dog and said piece coöperating while the piece is in either of two of its positions, but not coöperating while the piece is in its third position; and a handle for locating said piece in any of its three positions.

11. In a calculating machine: a totalizer; a primary and an auxiliary master couple for operating same, each of said couples containing a master wheel and a master dog; and driving mechanism for operating both couples.

12. In a calculating machine: a totalizer; a primary and an auxiliary master couple for operating same, each of said couples containing a master wheel and a master dog; driving mechanism for operating both couples; and means for disconnecting the master couple from the driving mechanism whereby the auxiliary master couple will remain stationary while the primary master couple is operated by the driving means.

13. In a calculating machine: a totalizer; a master wheel for operating same; driving mechanism for said master wheel; setting mechanism locatable in any of three positions, and adapted in its first position to cause the driving mechanism to rotate the master wheel in one direction, and when located in its second position to cause the driving mechanism to rotate the master wheel in the opposite direction, and when in the third position to cause the driving mechanism to hold the master wheel stationary; and locating means coöperating with the setting mechanism to prevent the operation of the driving mechanism when the setting mechanism is not exactly in any of its three positions.

14. In a calculating machine: a totalizer; a master wheel for operating same; driving mechanism for said master wheel; setting mechanism locatable in any of three positions, and adapted in the first position to cause the driving mechanism to rotate the master wheel in one direction, and when located in its second position to cause the driving mechanism to rotate the master wheel in the opposite direction, and when in the third position to cause the driving mechanism to hold the master wheel stationary; and mechanism for interfering with the operation of the driving mechanism when said setting mechanism is not exactly in any of its three positions.

15. In a calculating machine: a totalizer; a primary master wheel and an auxiliary master wheel for operating same; driving mechanism for said master wheels; setting mechanism locatable in any of three positions, and adapted in its first position to cause the driving mechanism to rotate the auxiliary master wheel in the same direction as the primary master wheel, and when in its second position to cause the driving mechanism to rotate the auxiliary master wheel in the opposite direction as the primary master wheel, and when in the third position to cause the driving mechanism to hold the auxiliary master wheel stationary while the primary master wheel rotates; and locating means coöperating with the setting mechanism to prevent the operation of the driving mechanism when the setting mechanism is not exactly in any of its three positions.

16. In a calculating machine: a totalizer; a primary master wheel and an auxiliary master wheel for operating same; driving mechanism for said master wheels; setting mechanism locatable in any of three positions, and adapted in its first position to cause the driving mechanism to rotate the auxiliary master wheel in the same direction as the primary master wheel, and when in its second position to cause the driving mechanism to rotate the auxiliary master wheel in the opposite direction as the primary master wheel, and when in the third position to cause the driving mechanism to hold the auxiliary master wheel stationary while the primary master wheel rotates; and mechanism for interfering with the operation of the driving mechanism when said setting mechanism is not exactly in any of its three positions.

17. In a calculating machine: a totalizer; a master wheel for operating same; driving mechanism for said master wheel; setting mechanism locatable in any of three positions, and adapted in its first position to cause the driving mechanism to rotate the master wheel in one direction, and when located in its second position to cause the driving mechanism to rotate the master wheel in the opposite direction, and when in the third position to cause the driving mechanism to hold the master wheel stationary; and a bolt and notch mechanism coöperating with the setting mechanism to prevent the operation of the driving mechanism when the setting mechanism is not exactly in any of its three positions.

18. In a calculating machine: a totalizer; a primary master wheel and an auxiliary master wheel for operating same; driving mechanism for said master wheels; setting mechanism locatable in any of three positions, and adapted in its first position to cause the driving mechanism to rotate the auxiliary master wheel in the same direction as the primary master wheel, and when in its second position to cause the driving mechanism to rotate the auxiliary master wheel in the opposite direction as the primary master wheel, and when in the third position to cause the driving mechanism to hold the auxiliary master wheel stationary while the primary master wheel rotates; and a bolt and notch mechanism coöperating with the setting mechanism to prevent the operation of the driving mechanism when the setting mechanism is not exactly in any of its three positions.

In witness whereof, I have hereunto subscribed my name in the presence of two witnesses.

JOHN C. WAHL.

Witnesses:
JOSEPHINE MAGUIRE,
EMILY ORT.